United States Patent [19]
Peerman et al.

[11] Patent Number: 4,561,922
[45] Date of Patent: Dec. 31, 1985

[54] POLYURETHANE ADHESIVES WITH IMPROVED WATER RESISTANCE CONTAINING A HYDROXYMETHYL FATTY POLYOL

[75] Inventors: Dwight E. Peerman, Minnetonka, Minn.; Kurt C. Frisch, Grosse Ile, Mich.

[73] Assignee: Henkel Corporation, Minneapolis, Minn.

[21] Appl. No.: 672,771

[22] Filed: Nov. 19, 1984

[51] Int. Cl.$^4$ .................... C09J 3/14; C08G 18/32
[52] U.S. Cl. ........................ 156/331.4; 427/385.5; 428/423.1; 528/76; 528/77; 528/85
[58] Field of Search .................... 528/76, 77, 85; 156/331.4; 427/385.5; 428/423.1

[56] References Cited
U.S. PATENT DOCUMENTS 4,229,562 10/1980 Rogier ................................ 528/85
4,423,162 12/1983 Peerman et al. .................. 521/164

Primary Examiner—Maurice J. Welsh
Attorney, Agent, or Firm—Ernest G. Szoke; Patrick J. Span; J. Daniel Wood

[57] ABSTRACT

Polyurethane adhesives compositions are provided which exhibit improved water resistance. These polyurethane adhesives are prepared from a mixture comprising a hydroxymethyl fatty polyol and a polyisocyanate.

8 Claims, No Drawings

POLYURETHANE ADHESIVES WITH IMPROVED WATER RESISTANCE CONTAINING A HYDROXYMETHYL FATTY POLYOL

FIELD OF THE INVENTION

This invention relates to polyurethane adhesive compositions. More particularly, this invention relates to polyurethane adhesive compositions having improved water resistance which are prepared from a hydroxymethyl fatty polyol or an alkylene oxide derivative thereof.

BACKGROUND OF THE INVENTION

U.S. Pat. No. 4,423,162 to Peerman et al. discloses that amide polyols or ester polyols derived from hydroxymethyl-substituted fatty acids can be reacted with polyisocyanates to form polyurethane elastomers, foams, protective coatings and adhesives.

U.S. Ser. No. 415,522, filed Sept. 7, 1982, now U.S. Pat. No. (4280) discloses that polyols derived from the hydroxyalkylation of certain hydroxymethyl substituted fatty amides or esters can be reacted with polyisocyanates to form polyurethanes.

U.S. Pat. No. 4,229,562 to Rogier discloses that hydroxymethyl fatty polyols derived from an unsaturated fatty alcohol can be reacted with polyisocyanates to form coatings and molded articles.

SUMMARY OF THE INVENTION

This invention relates to a polyurethane adhesive composition prepared from a mixture comprising a polyisocyanate and a hydroxymethyl fatty polyol or an alkylene oxide derivative thereof. This invention also relates to a process for preparing the polyurethane adhesive comprising (a) mixing a polyisocyanate with a polyol comprising a hydroxymethyl fatty polyol or an alkylene oxide derivative thereof, (b) applying the mixture to a substrate and (c) contacting the resulting mixture with a surface of an article to be bonded to the substrate.

The polyurethane adhesive compositions of this invention exhibit improved water resistance over polyurethane adhesives prepared from mixtures which do not contain a hydroxymethyl fatty polyol or an alkylene oxide derivative thereof.

DETAILED DESCRIPTION OF THE INVENTION

The polyisocyanate compounds which may be reacted with the hydroxymethyl fatty polyols and/or their alkylene oxide derivatives to form the adhesive compositions of the present invention are described in U.S. Pat. No. 4,229,562, incorporated herein by reference thereto. The preferred polyisocyanates are toluene diisocyanate (and 80/20 mixture of the 2,4 and 2,6 isomers of toluene diisocyanate), diphenylmethane diisocyanate in and modifications thereof available from Upjohn as Isonate 125M, 143L, 181, 191 and 226, and isophorone diisocyanate.

The hydroxymethyl fatty polyols of the present invention, and methods for preparing the same, are known in the art and are described in U.S. Pat. No. 4,229,562, incorporated herein by reference thereto. The term "hydroxymethyl fatty polyol" is intended to be generic to (i) fatty polyols containing geminal bis(hydroxymethyl) groups, i.e. gem-bis(hydroxymethyl) fatty polyols, and (ii) fatty polyols containing only isolated hydroxymethyl groups, i.e. non-gem (hydroxymethyl) fatty polyols, and (iii) mixtures thereof.

Examples of gem-bis(hydroxymethyl) fatty polyols include those derived from linoleyl alcohol such as 9,9(10,10)-bis(hydroxymethyl)octadecene-12-ol, and 9,9,12,12(10,10,13,13)-tetrakis(hydroxymethyl)octadecanol, and those derived from linolenyl alcohol such as 9,9(10,10)-bis(hydroxymethyl)octadecadiene-12,15-ol, 9,9,12,12(10,10,13,13)-tetrakis(hydroxymethyl)octadecene-15-ol, and 9,9,12,12,15,15(10,10,13,13,16,16)-hexakis(hydroxymethyl)octadecanol. Examples of non-gem(hydroxymethyl) fatty polyols include those derived from linoleyl alcohol such as 9(10)-hydroxymethyl-octadecene-12-ol and 9,12(10,13)-bis(hydroxymethyl)octadecanol and those derived from linolenyl alcohol such as 9(10)-hydroxymethyloctadecadiene-12,15-ol, 9,12(10,13)-bis(hydroxymethyl)octadecene-15-ol, and 9,12,15(10,13,16)-tris(hydroxymethyl)octadecanol. The preferred hydroxymethyl fatty polyols are those based upon the hydroformylation and reduction of oleic acid, i.e. 9,9(10,10)-bis(hydroxymethyl)octadecanol and 9(10)-(hydroxymethyl)octadecanol.

The hydroxymethyl fatty polyols may be hydroxyalkylated by reacting them with alkylene oxides having from 2-8 carbon atoms. The preferred alkylene oxide is propylene oxide, but ethylene oxide, 1,2-butylene oxide, 2,3-butylene oxide, and the like may also be used. The use of mixtures of alkylene oxides will also produce derivatives within the contemplation of the present invention. The resulting derivatives are ethers or polyethers of the hydroxymethyl fatty polyols which have the same hydroxyl functionality as the hydroxymethyl fatty polyol chosen as a starting material. Because the hydroxyalkylation reaction with propylene oxide yields derivatives having substantial numbers of secondary hydroxyl groups, a hydroxymethyl fatty polyol that has been reacted with propylene oxide may be subsequently reacted with ethylene oxide, i.e. capped, to provide a derivative with higher numbers of primary hydroxyl groups.

The amount of alkylene oxide used to derivatize the hydroxymethyl fatty polyols may vary. The particular amount of alkylene oxide chosen will depend upon the particular properties desired in the derivative which in turn will depend upon the properties desired in the resulting polyurethane adhesive. The hydroxyalkylation reaction is preferably conducted in the presence of a basic material which catalyzes the reaction of the alkylene oxide with the hydroxymethyl fatty polyol. Examples of suitable basic materials include alkali and alkaline earth metal hydroxides and carbonates.

It has been found that by using a hydroxymethyl fatty polyol as the sole polyol, or as a significant component in a mixture of polyols it is possible to make a significant improvement in the water resistance of polyurethane adhesives. This improvement is noted in four types of adhesive systems: hard, rigid polyurethanes, either thermoplastic or thermoset, for bonding rigids substrates and soft elastomeric polyurethane adhesives, either thermoplastic or thermoset, for bonding flexible substrates.

The mixtures from which the polyurethane adhesives of the present invention are prepared may also contain an additional copolyol. The additional copolyols are also described in U.S. Pat. No. 4,229,562, incorporated herein by reference thereto.

In preparing the adhesives of this invention, it was found that the hydroxymethyl fatty polyols useful in this invention are hard segment contributors; i.e. that the hydroxymethyl fatty polyol contributes to the rigidity of the polyurethane adhesive. Therefore, a polyurethane prepared using a hydroxymethyl fatty polyol alone, or with a conventional hard-segment contributor (e.g. 1,4-butanediol), is a rigid unsegmented polyurethane. In preparing a flexible segmented adhesive, a copolyol that is a soft-segment contributor, e.g. a long-chain polyether polyol, was used to reduce the rigidity of the polyurethane adhesive. In thermoplastic systems, the long-chain polyether copolyol should, of course, be a diol. In thermoset systems, the copolyol may be a diol but is preferably a triol or tetrol.

The long-chain polyether polyols useful as copolyols are well known and readily available commercially. For the purpose of preparing the fatty, segmented polyester elastomers of this invention, preferred long-chain polyether polyols are polyalkylene diols or triols having from 2-4 carbon atoms in the alkylene portion thereof and a total molecular weight in the range of about 400 to about 3,000. The preferred long-chain ether diols are those having an alkylene group which is unbranched, i.e. in which the alkylene group is a chain of unsubstituted methylene units. An especially preferred polyalkylene ether diol is a polytetramethylene ether glycol with a molecular weight of approximately 2,000 which is a reaction product of the polymerization of tetrahydrofuran.

A short-chain alkylene diol may also be used as a copolyol to vary the properties of the resulting polyurethane adhesive. Preferably, these alkylene diols will have a molecular weight in the range of about 60 to about 400. Especially preferred short-chain diols for preparing the present polyester elastomers are ethylene glycol, 1,4-butanediol, propylene glycol, neopentyl glycol, diethylene glycol, pentamethylene glycol and poly(ethylene glycol).

Considerable variation is possible in the relative proportions of the reactants employed depending upon the particular set of properties desired in the polyurethane adhesive.

In studying rigid adhesives, three rigid substrates were used: steel, aluminum, and hardwood. In studying flexible adhesives, three flexible substrate systems were used: plasticized vinyl, such as that used for upholstery or shoes, thin cold rolled steel, and plasticized vinyl bonded to elastomeric shoe soling material (e.g. rubber). In all studies, the polyurethane elastomers of the present invention were compared with polyurethane elastomers from competitive polyols of similar hardness whenever possible. The reason for attempting to maintain the hardness of the adhesives within a similar range is that hardness is related to strength. Even though the comparisons are based on percentage retained strength after exposure, it was thought advisable to eliminate possible variableness caused by a widely differing tensile strength between the pairs under study. However, it was not always possible to keep hardness as close as desirable.

Because of their excellent adhesive properties, polyurethane elastomers enjoy wide usage in bonding applications. The major disadvantage of urethane adhesives is their tendency to degrade under hydrolytic attack. For this reason, any improvement in their resistance to aqueous environments is an advance in the art and should extend their sphere of utility into applications requiring greater water resistance than current products.

EXAMPLES

A. Starting Materials

1. Hydroxymethyl Fatty Polyols
HMFP-1: 9(10)-(hydroxymethyl)octadecanol.
HMFP-2: 9,9(10,10)-bis(hydroxymethyl)octadecanol.
HMFP-3: a hydroxypropyl ether prepared by propoxylating 1 mole of HMFP-1 with 2 moles of propylene oxide.
HMFP-4: a polyoxypropylene ether prepared by propoxylating 1 mole of HMFP-1 with 6 moles of propylene oxide.

2. Short-Chain Polyols
SCP-1: 1,4-butanediol.
SCP-2: trimethylolpropane.

3. Long-Chain Polyols
LCP-1: polyoxytetramethylene glycol; M.W. of 650.
LCP-2: polyoxytetramethylene glycol; M.W. of 1000.
LCP-3: polyoxytetramethylene glycol; M.W. of 2000.
LCP-4: polyoxypropylene glycol; M.W. of 448.
LCP-5: propoxylated trimethylolpropane; M.W. of 424.
LCP-6: polycaprolactone diol; M.W. of 530.
LCP-7: polycaprolactone diol; M.W. of 200.

4. Polyisocyanates
NCO-1: an 80/20 mixture of 2,4 and 2,6 toluene diisocyanate, respectively.
NCO-2: carbodiimide modified diphenylmethane diisocyanate available from Upjohn as Isonate 143L.
NCO-3: isophorone diisocyanate.

B. Procedure

In the following examples, the indicated polyols were blended and degassed. To the polyol premix was added a polyisocyanate. This mixture was heated gradually to 60° C. with stirring until a visible increase in viscosity occurred. The mixture was then applied to the indicated substrate and a second substrate was then placed on the mixture. The samples were then held at 100° C. for 24 hours to cure the adhesive. The samples were then conditioned for seven days at 23° C. and 50% relative humidity. The Shore D hardness of the rigid adhesives and the Shore A hardness of the flexible adhesives were measured according to ASTM-D 2240.

The original tensile shear strength (OTSS) of the rigid adhesives was measured according to ASTM-D 1002. Duplicate samples were then immersed in a 70° C. water bath for 24 hours whereupon the retained tensile shear strength was measured and reported as a percentage of tensile shear strength retained (TSSR). The results are shown in Table I.

The original 180° peel strength of the flexible adhesives was measured according to ASTM-D 903. Duplicate samples were then immersed in a 70° C. water bath for 24 hours whereupon the retained 180° peel strength of the samples was measured and reported as a percentage of 180° peel strength retained. The results are shown in Table II.

C. Rigid Polyurethane Adhesives

1. Thermoplastic

EXAMPLE I

Three polyols were blended together and degassed under vacuum: 14.02 grams (0.092 eq) of HMFP-1, 11.33 g. (0.012 eq) of LCP-3, and 2.07 g. (0.046 eq) of SCP-1. To these was added 2.58 g (0.15 eq) of NCO-2 and the reactants were heated gradually to 60° C. with stirring. After 8 minutes the elastomer was applied to the three substrates and cured for 24 hours at 100° C. The bonds were then stored for seven days in a room controlled to 23° C. 50% R.H. Shore D hardness was 56.

COMPARATIVE EXAMPLE A

Using the same procedure as used in Example 1 and for comparison with the elastomers thereof, two polyols were blended with NCO-2 in the ratios: 22.24 g (0.023 eq) of LCP-3, 5.60 g (0.12 eq) of SCP-1 and 22.16 g (0.15 eq) of NCO-2. Shore D hardness was 52.

EXAMPLE 2

The only variations in procedure of all remaining examples was the time of mixing after adding the MDI. Generally, the reactants were blended until a visible increase in viscosity took place, usually in from three to twenty minutes. The elastomer was prepared from 13.90 g (0.091 eq) of HMFP-1, 11.64 g (0.011) of LCP-7, 2.06 g (0.046 eq) of SCP-1 and 22.40 g (0.15 eq) of NCO-2. Shore D hardness was 47.

COMPARATIVE EXAMPLE B

The elastomer was prepared from 22.68 g (0.22 eq) of LCP-7, 5.51 g (0.12 eq) of SCP-1 and 21.81 g (0.15 eq) of NCO-2. The Shore D hardness was 52.

2. Thermoset

EXAMPLE 3

A rigid crosslinked urethane adhesive was prepared from 11.14 g (0.074 eq) of HMFP-1, 2.72 g (0.024 eq) of HMFP-2, 13.14 g (0.025 eq) of LCP-2, 1.06 g (0.024 eq) of SCP-1 and 21.89 g (0.15 eq) of NCO-2. It had a Shore D hardness of 58.

COMPARATIVE EXAMPLE C

For comparison with Example 3 an elastomer was prepared from 20.87 g (0.04 eq) of LCP-2, 3.53 g (0.08 eq) of SCP-1, 1.97 g (0.04 eq) of SCP-2 and 23.63 g (0.16 eq) of NCO-2. It had a Shore D hardness of 63.

EXAMPLE 4

A rigid crosslinked elastomer was prepared from 20.46 g (0.097 eq) of HMFP-3, 9.29 g (0.61 eq) of HMFP-1, 3.52 g (0.031 eq) of HMFP-2 and 16.73 (0.193 eq) of NCO-1. It had a Shore D hardness of 63.

COMPARATIVE EXAMPLE D

To compare with the elastomer of Example 4 an elastomer was prepared from 25.37 g (0.11 eq) of LCP-4, 3.23 g (0.073 eq) of SCP-1, 1.77 g (0.037 eq) of SCP-2 and 19.63 g (0.23 eq) of NCO-1. It had a Shore D hardness of 80.

EXAMPLE 5

A rigid crosslinked elastomer was prepared from 17.49 g (0.12 eq) of HMFP-1, 12.56 g (0.11 eq) HMFP-2 and 19.95 g (0.23 g) of NCO-1. It has a Shore D hardness of 77.

COMPARATIVE EXAMPLE E

To compare with the elastomer of Example 5 a rigid crosslinked elastomer was prepared from 23.17 g (0.087 eq) of LCP-6, 11.70 g (0.083 eq) of LCP-5 and 15.13 g (0.17 eq) of NCO-1. It had a Shore D hardness of 56.

D. Flexible Polyurethane Adhesives

1. Thermoplastic

EXAMPLE 6

This flexible elastomer was prepared from 12.87 g (0.083 eq) of HMFP-1, 17.30 g (0.053 eq) of LCP-1, 650, 1.23 (0.027 eq) of SCP-1 and 18.60 g (0.17 eq) of NCO-3. It had a Shore A hardness of 66.

COMPARATIVE EXAMPLE F

To compare with the elastomer of Example 6 the elastomer was prepared from 31.57 grams (0.097 eq) of LCP-1, 2.13 g (0.047 eq) of SCP-1 and 16.30 g (0.15 eq) of NCO-3. It had a Shore a hardness of 62.

2. Thermoset

EXAMPLE 7

A flexible crosslinked polyurethane adhesive was prepared by reacting 25.60 g (0.080 eq) of HMFP-4, 6.97 g (0.046 eq) of HMFP-1, 3.51 g (0.031 eq) of HMFP-2 and 13.92 g (0.161 eq) of NCO-1. This elastomeric adhesive had a Shore A hardness of 55.

COMPARATIVE EXAMPLE G

To compare with the elastomer of Example 7 an elastomer was prepared from 29.83 g (0.093 eq) of LCP-1, 2.37 g (0.053 eq) of SCP-1, 1.77 g (0.037 eq) of SCP-2 and 16.03 g (0.18 eq) of NCO-1. This elastomer had a Shore A hardness of 74.

TABLE I

TENSILE SHEAR STRENGTH OF RIGID POLYURETHANE ADHESIVES

| EXAMPLE | STEEL OTSS (psi) | STEEL TSSR (%) | ALUMINUM OTSS (psi) | ALUMINUM TSSR (%) | HARDWOOD OTSS (psi) | HARDWOOD TSSR (%) |
|---|---|---|---|---|---|---|
| 1 | 1644 | 83 | 1123 | 75 | 1050 | 41 |
| A | 1739 | 52 | 1887 | 3 | 1979 | 36 |
| 2 | 2055 | 43 | 1573 | 59 | 843 | 50 |
| B | 2267 | 32 | 1691 | 33 | 1673 | 42 |
| 3 | 1529 | 89 | 1748 | 68 | 1171 | 48 |
| C | 2381 | 49 | 2101 | 57 | 1055 | 43 |
| 4 | 1028 | 84 | 1311 | 55 | 78 | 11 |
| D | 3294 | 31 | 2082 | 45 | 305 | 6 |
| 5 | 2722 | 56 | 1799 | 80 | 2246 | 41 |
| E | 1146 | 56 | 1001 | 47 | 163 | 28 |

TABLE II

180° PEEL STRENGTH OF FLEXIBLE POLYURETHANES

| EXAMPLE | VINYL PS, PI | VINYL % R | STEEL PS, PI | STEEL % R | RUBBER/VINYL PS, PI | RUBBER/VINYL % R |
|---|---|---|---|---|---|---|
| 6 | 4.2 | 81 | 11.2 | 77 | 7.0 | 43 |
| F | 2.1 | 71 | 5.3 | 81 | 13.8 | 28 |
| 7 | 5.8 | 98 | 6.6 | 79 | 14.8 | 76 |
| G | 2.5 | 96 | 14.7 | 54 | 11.8 | 56 |

As may be observed from the above paired examples in Tables I and II, the representative hydroxymethyl fatty polyols with one exception, have better strength retention after exposure to hot water than their corresponding counterparts from polyols most commonly used in polyurethane adhesives. This is true even when the hydroxymethyl fatty polyol comprises only a part of the polyol system. It is true whether the comparative polyol is a polyether or a polyester. More importantly, it is true even when the hydroxymethyl fatty polyol is present at a lower percentage by weight than the comparative polyol.

What is claimed is:

1. A method of adhesively bonding comprising (a) mixing a polyisocyanate with a polyol comprised of a hydroxymethyl fatty polyol or an alkylene oxide derivative thereof, (b) applying the mixture to a substrate and (c) contacting the applied mixture with a surface of an article to be bonded to the substrate.

2. A method in accordance with claim 1 wherein the mixture is comprised of a hydroxymethyl fatty polyol which is 9,9(10,10)-bis(hydroxymethyl)octadecanol.

3. A method in accordance with claim 1 wherein the mixture is comprised of a hydroxymethyl fatty polyol which is 9(10)-(hydroxymethyl)octadecanol.

4. A method in accordance with claim 1 wherein the polyol is further comprised of an amount of a long-chain polyether copolyol sufficient to lessen the rigidity of the resulting adhesive.

5. A method in accordance with claim 4 wherein the long-chain polyether copolyol is a polyoxytetramethylene diol having a molecular weight in excess of about 400 g/mol.

6. A method in accordance with claim 4 wherein the long-chain polyether copolyol is a propoxylated trimethylolpropane.

7. A bonded article prepared by the method of claim 1.

8. A bonded article in accordance with claim 7 wherein the adhesive composition is prepared from a mixture further comprising an amount of a long-chain polyether sufficient to lessen the rigidity of the resulting adhesive.

* * * * *